United States Patent [19]

Collet

[11] 4,005,263
[45] Jan. 25, 1977

[54] DEVICE FOR ADJUSTING THE DISTANCE BETWEEN THE OBJECTIVE AND THE PICK-UP TUBE IN A TELEVISION CAMERA

[75] Inventor: Pierre Jacques Collet, Louviers, France

[73] Assignee: U.S. Philips Corporation, New York, N.Y.

[22] Filed: Jan. 2, 1976

[21] Appl. No.: 646,023

[30] Foreign Application Priority Data

Jan. 14, 1975  France .............................. 75.00955

[52] U.S. Cl. ................................. 358/227; 358/41
[51] Int. Cl.$^2$ .......................................... H04N 5/26
[58] Field of Search ........... 178/7.92, 7.1; 354/195, 354/286; 358/41, 42

[56] References Cited

UNITED STATES PATENTS

| 3,400,212 | 9/1968 | Plummer | 178/7.92 |
| 3,652,784 | 12/1969 | Wupper | 178/7.92 |
| 3,659,045 | 4/1972 | Siebert | 178/7.92 |
| 3,883,883 | 5/1975 | Samo | 178/7.92 |

Primary Examiner—Benedict V. Safourek
Assistant Examiner—Edward L. Coles
Attorney, Agent, or Firm—Frank R. Trifari; David R. Treacy

[57] ABSTRACT

An adjusting device for a television camera consists of a resilient tubular member which is arranged between the window of the pick-up tube and the objective and which is compressed when an adjusting member acts on the neck of the tube. The deformation of the tubular member enables accurate distance adjustment without it being necessary to rotate the objective or the housing.

10 Claims, 3 Drawing Figures

DEVICE FOR ADJUSTING THE DISTANCE BETWEEN THE OBJECTIVE AND THE PICK-UP TUBE IN A TELEVISION CAMERA

The invention relates to a television camera comprising an objective, a pick-up tube and a device for adjusting a distance between the objective and the pick-up tube, the said device comprising a displacement mechanism, including a return mechanism, for the longitudinal displacement of the pick-up tube.

It is known to adjust the position of the objective with respect to the target of the pick-up tube in television cameras by screwing an objective holder until an optimum focussed image is obtained. The devices used consists of a threaded holder wherein the objective is mounted. The threaded holder usually comprises a blocking member, for example, in the form of an adjusting screw.

An adjustment problem occurs if the objective comprises a reflex view-finder which does not permit the rotation of the objective. In that case mechanical "prepositioning" must be performed, and the adjustment must be completed by a very restricted rotation of the objective. This final adjustment preferably does not amount to more than one-eighth revolution of the objective and is smaller as the distance between the viewfinder and the housing of the camera is smaller.

The invention has for its object to facilitate this adjustment by utilising a rigidly arranged objective and an axially displaceable pick-up tube.

A device for adjusting the distance between the objective and the pick-up tube in a television camera of the kind set forth according to the invention is characterized in that the displacement mechanism comprises a fixed ring which at least partly enclosed the pick-up tube, an abutment piece and an adjusting member, the abutment piece being arranged between the said adjusting member and the pick-up tube, the return mechanism comprising a resilient member which is arranged between the rigidly arranged objective and the movably arranged pick-up tube.

The return mechanism is mounted in a tubular element, the ends of which cooperate with circular edges formed on the objective holder and on the window of the pick-up tube. The movable mechanism comprises retaining means which, in a preferred embodiment, include a ring which grips the edge of the objective and/or of the tube.

The length of the return mechanism in the rest position is slightly larger than the final adjusting distance between the objective and the window of the pick-up tube.

The abutment piece is a component which can be secured, for example, to the pumping stem of the pick-up tube.

The tubular resilient element is made of plastic material.

The invention will be described in detail hereinafter with reference to the drawing.

Figure 1:
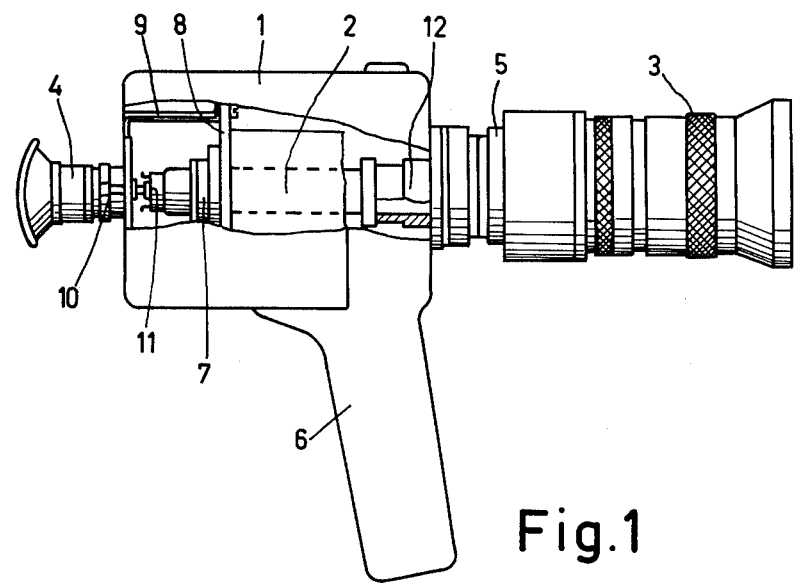
FIG. 1 is a partial sectional view of a television camera comprising the device in accordance with the invention.

A television camera as shown in FIG. 1, comprises a housing 1 which accommodates electronic circuits for operating a pick-up tube 2 and for the output of image signals. The housing 1 has connected to it an objective 3 and a reflex view finder 4. The objective comprises a diaphragm 5. The housing furthermore comprises a grip 6 which also serves for the passage of connection cables. The adjusting mechanism for the longitudinal displacement of the pick-up tube comprises a ring 7 wherein at least part of the pick-up tube is slid. This ring is fixed with respect to the camera housing by a supporting member 8 which is secured to the chassis of the housing, for example, by transverse connections 9. A displacement member 10, in this case consisting of a screw which cooperates with a nut or a thread in the chassis, enables displacement of the pick-up tube in the longitudinal direction via an abutment piece 11. For accurate adjustment, it is necessary that the pick-up tube can remain in permanent contact with the displacement member; to this end, a return mechanism 12 is arranged between the pick-up tube 2 and the objective 3 or an element which forms part of the objective and which occupies a fixed position with respect thereto in the longitudinal direction such as, for example, the diaphragm 5. In this preferred embodiment the return mechanism comprises a cylindrical resilient member.

Figure 2:
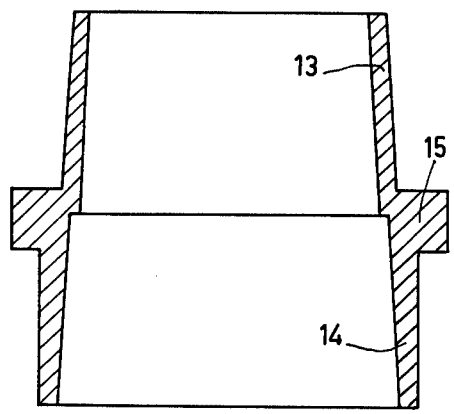
FIGS. 2 and 3 show embodiments of resilient members for an adjusting mechanism in accordance with the invention.

In a further preferred embodiment, the cylindrical component has a thin or corrugated wall which enables deformation in the longitudinal direction. On its end this member can comprise portions having a larger thickness, so that the support by the round edges of the objective and the tube is enhanced. FIG. 2 is a sectional view of a preferred embodiment of such a cylindrical member, consisting of two portions, one of which is conical and fits, for example, on an objective having a diameter which is smaller than that of the window of the tube and which is contacted by a substantially cylindrical second portion 14. The tubular member is provided on its outer surface with a ring 15 whereto a supporting member can be coupled which is secured either to the tube or to the objective. Due to the use of such a tubular member, decentring during assembly, when no pressure is yet exerted, is avoided.

Figure 3:
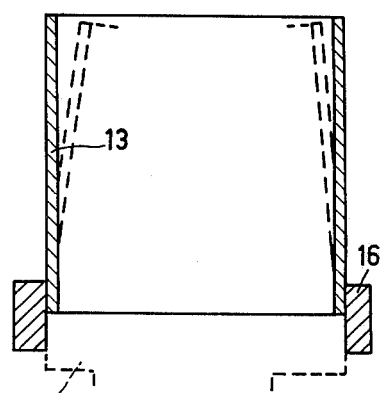

FIG. 3 shows a further embodiment of a retaining means. A ring 16, arranged on an end of a resilient cylinder, has an inner diameter which is adapted to the pick-up tube 2 or to that of a ring of the objective holder. A broken line indicates that the resilient cylinder can also have a conical shape. The cylinder can also be of a double construction, a conical or non-conical cylinder then being situated one on each side of the ring.

The resilient member is preferably of a plastic material by moulding.

The abutment piece 11 (FIG. 1) is formed by a component of plastic material which is connected to the pumping stem of the pick-up tube or which is secured on the jacket of the pick-up tube.

The adjusting device is mounted, for example, as follows: a tubular member is secured against the objective, is arranged on the end of the pick-up tube or is accommodated in the supporting member, after which the pick-up tube is slid into the ring of the supporting member of the pick-up tube and is so pressed that the resilient member presses against the window as well as against the objective; subsequently, the abutment piece is positioned and is clamped lightly against the tube by the screw. The length of the resilient member is chosen such that adjustment is possible over a distance which is smaller than this length. The distance between the window and the target of the pick-up tube is rather exactly defined, which enables determination of the maximum length of the resilient member.

Adjustment is effected by tightening the screw, thus compressing the resilient member; when the adjusting point has been passed, the resilient member will tend to retain the original height when the screw is turned in the opposite direction, thus pushing back the pick-up tube, the pick-up tube, the abutment piece and the displacement member then constantly being maintained on contact with each other. Blocking is effected in known manner, for example, by the clamping of a ring or by blocking by means of a screw. The resilient member offers the additional advantage that it constitutes a dust-tight chamber between objective and window of the pick-up tube.

What is claimed is

1. A television camera comprising an objective, a pick-up tube and a device for adjusting a distance between the objective and the pick-up tube, the said device comprising a displacement mechanism, including a return mechanism, for the longitudinal displacement of the pick-up tube, characterized in that the displacement mechanism comprises a fixed ring which at least partly encloses the pick-up tube, an abutment piece, and an adjusting member, the abutment piece being arranged between the said adjusting member and the pick-up tube, the return mechanism comprising a resilient member which is arranged between the rigidly arranged objective and the movably arranged pick-up tube.

2. A television camera as claimed in claim 1, characterized in that the resilient member which forms part of the return mechanism consists of a deformable tubular component.

3. A television camera as claimed in claim 2, characterized in that the tubular component comprises portions on its ends which can be coupled to circular edges of the objective and of the window of the pick-up tube.

4. A television camera as claimed in claim 3, characterized in that the portions situated on the ends of the tubular component are formed by edges of the tubular component.

5. A television camera as claimed in characterized in that the tubular component is made of plastic material.

6. A television camera tube as claimed in claim 1 characterized in that return mechanism comprises retaining means.

7. A television camera as claimed in claim 6, characterized in that the retaining means are formed by a ring.

8. A television camera as claimed in claim 6, characterized in that the said retaining means are formed by at least one of the ends which grips the edge of the objective and/or the tube.

9. A television camera as claimed in claim 1, characterized in that the length of the return mechanism in the rest position is slightly larger than the final adjusting distance between the objective and the window of the tube.

10. A television camera as claimed in claim 1, characterized in that the abutment piece is a component which can be mounted on the sleeve of the tube.

* * * * *

UNITED STATES PATENT AND TRADEMARK OFFICE
CERTIFICATE OF CORRECTION

PATENT NO. : 4,005,263
DATED : January 25, 1977
INVENTOR(S) : PIERRE JACQUES COLLET It is certified that error appears in the above-identified patent and that said Letters Patent are hereby corrected as shown below:

Col. 4, line 13, after "as claimed in" insert --claim 2--

Signed and Sealed this

Twelfth Day of April 1977

[SEAL]

Attest:

RUTH C. MASON
*Attesting Officer*

C. MARSHALL DANN
*Commissioner of Patents and Trademarks*